(12) United States Patent
Paweletz

(10) Patent No.: US 9,205,783 B2
(45) Date of Patent: Dec. 8, 2015

(54) ARTICLE HOLDING DEVICE

(71) Applicant: Robert Bosch GmbH, Stuttgart (DE)

(72) Inventor: Anton Paweletz, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 14/099,063

(22) Filed: Dec. 6, 2013

(65) Prior Publication Data

US 2014/0158849 A1 Jun. 12, 2014

(30) Foreign Application Priority Data

Dec. 7, 2012 (DE) .......................... 10 2012 222 532

(51) Int. Cl.
*A47G 1/17* (2006.01)
*B60R 7/06* (2006.01)
*B60R 11/02* (2006.01)
*B60R 11/00* (2006.01)

(52) U.S. Cl.
CPC .............. *B60R 7/06* (2013.01); *B60R 11/0258* (2013.01); *B60R 2011/0063* (2013.01)

(58) Field of Classification Search
CPC ...... G09F 7/18; F09F 2007/1852; B60R 7/06; B60R 11/0258; B60R 2011/0063
See application file for complete search history.

(56) References Cited

U.S. PATENT DOCUMENTS

| | | | | |
|---|---|---|---|---|
| 4,287,676 | A | * | 9/1981 | Weinhaus ................... 40/661.01 |
| 8,535,791 | B2 | * | 9/2013 | Dhinojwala et al. ........... 428/220 |
| 8,783,634 | B2 | * | 7/2014 | Summers et al. ........... 248/205.5 |
| 2013/0142986 | A1 | * | 6/2013 | Christian et al. ................ 428/95 |
| 2014/0263908 | A1 | * | 9/2014 | Franklin .................... 248/309.4 |

* cited by examiner

Primary Examiner — Amy Sterling
(74) Attorney, Agent, or Firm — Michael Best & Friedrich LLP

(57) ABSTRACT

An article holding device for holding a navigation system or similar device. The article holding device includes at least one article holding element, which is intended to hold at least one article in at least one position. In at least one embodiment, the article holding element has a multiplicity of micro holding elements which are configured to generate at least one holding force.

12 Claims, 3 Drawing Sheets

ARTICLE HOLDING DEVICE

BACKGROUND OF THE INVENTION

An article holding device, in particular a navigation system holding device, with at least one article holding element, which is intended to hold at least one article, in particular a navigation system, in at least one position has already been proposed.

SUMMARY OF THE INVENTION

The invention is based on an article holding device, in particular a navigation system holding device, with at least one article holding element, which is intended to hold at least one article, in particular a navigation system, in at least one position.

It is proposed that the article holding element has a multiplicity of micro holding elements, which are intended to bring about at least one holding force. In particular, the micro holding elements are intended to hold the article in position while avoiding a, particularly fixed mechanical, positive engagement, in particular a positive engagement of the article holding element with the article. An "article holding device" is to be understood in particular as meaning a device which is intended to arrange, preferably stabilize, in particular releasably fix and/or fasten, at least one article, in particular a navigation system, in at least one position. An "article holding element" is to be understood in particular as meaning an element of the article holding device. In particular, the article holding element is intended to arrange, preferably stabilize, in particular releasably fix and/or fasten, the article in position. A "micro holding element" is to be understood in particular as meaning an element which, with a projection of the micro holding element into a plane, has a longitudinal extent of less than 100 µm, preferably of less than 10 µm, in particular of less than 5 µm and particularly preferably of less than 2 µm. In particular, with the projection of the element into the plane, the micro holding element has a transverse extent of less than 20 µm, preferably of less than 10 µm and in particular of less than 6 µm. Preferably, the micro holding element is arranged in at least one surface region of at least one element, in particular an article holding element surface region of the article holding element. In particular, the micro holding element is intended to make a contribution to a generation of the holding force. Preferably, the micro holding element is intended in particular to make the contribution to the generation of the holding force in dependence on, in particular in the presence of, at least one, preferably external, stimulus. In particular, in the absence of the stimulus, the micro holding element is arranged in a forceless state. Preferably, the micro holding element is formed as an element of a micro holding structure. A "micro holding structure" is to be understood in particular as meaning a structure which has at least one micro holding lamella, preferably a multiplicity of micro holding lamellae, and at least one micro holding element, preferably a multiplicity of micro holding elements. In particular, the micro holding structure is intended to make a contribution to a generation of the holding force by means of the micro holding element. Preferably, with a projection of the micro holding structure into a plane, the micro holding structure has a longitudinal extent of less than 10 mm, preferably of less than 1 mm, in particular of less than 0.5 mm and particularly preferably of less than 0.2 mm. In particular, with the projection of the micro holding structure into the plane, the micro holding structure has a transverse extent of less than 20 µm, preferably of less than 10 µm and in particular of less than 6 µm. Preferably, the micro holding structure is arranged in the surface region of the element. A "micro holding lamella" is to be understood in particular as meaning a lamella which, with a projection of the micro holding lamella into a plane, has a longitudinal extent of less than 10 mm, preferably of less than 1 mm, in particular of less than 0.5 mm and particularly preferably of less than 0.2 mm. In particular, with the projection of the micro holding lamella into the plane, the micro holding lamella has a transverse extent of less than 20 µm, preferably of less than 10 µm and in particular of less than 6 µm. Preferably, the micro holding lamella is intended to connect, preferably arrange, in particular fasten, the micro holding element to/on the surface of the element, in particular the article element surface of the article holding element. A "holding force" is to be understood in particular as meaning a force exerted by the multiplicity of micro holding elements on the article. In particular, the holding force is intended to hold the article in position, in particular in direct contact with the article holding element. Preferably, the holding force is formed as a force between the article element surface of the article holding element and at least one surface of the article. In particular, the holding force is formed as a force deviating from a force that is produced by a positively engaging connection. Preferably, the holding force comprises a holding force density of more than $10$ $N/cm^2$, preferably of more than $15$ $N/cm^2$, in particular of more than $20$ $N/cm^2$ and particularly preferably of more than $25$ $N/cm^2$. An "article holding element surface region" of an element, in particular of the article holding element, is to be understood in particular as meaning a region at a distance of less than 100 mm, preferably of less than 50 mm and in particular of less than 1 mm from an outer delimiting line and/or an outer delimiting surface of the element. "Intended" is to be understood in particular as meaning especially programmed, designed and/or equipped. A configuration according to the invention advantageously allows the article to be effectively and securely held in position.

Furthermore, it is proposed that at least one of the micro holding elements is intended to bring about at least one adhesive force. In particular, the holding force is formed as a sum of at least two adhesive forces, in particular of a multiplicity of adhesive forces. An "adhesive force" is to be understood in particular as meaning a force between at least two condensed phases coming into contact. In particular, a proportion of a vapor pressure in an absolute amount of the adhesive force is less than 15%, preferably less than 5% and in particular less than 2%. Preferably, the adhesive force is at least partially formed as a molecular interaction. In particular, the adhesive force is intended to bring about a cohesion, preferably a mechanical cohesion, between the two condensed phases. Preferably, the adhesive force is formed as at least a mechanical adhesive force and/or as at least a special adhesive force. A "mechanical adhesive force" is to be understood in particular as meaning a mechanical and/or physical force which is at least partially produced by means of at least an interlocking, preferably a wedged interlocking, in particular an interlinking, of particles, preferably with a size in a range of several µm, of a respective one of the two condensed phases in one another. A "special adhesive force" is to be understood in particular as meaning a chemical and/or physical and/or thermodynamic force. A "condensed phase" is to be understood in particular as meaning a solid body and/or a liquid. The phrase that the "adhesive force is at least partially formed as a molecular interaction" is to be understood in particular as meaning that an absolute amount of the adhesive force is produced in a proportion of over 70%, preferably of over 80% and in particular of over 90%, by the molecular interaction.

The phrase that the "mechanical adhesive force is at least partially produced by means of at least an interlocking of particles of a respective one of the two condensed phases in one another" is to be understood in particular as meaning that an absolute amount of the mechanical adhesive force is produced in a proportion of over 70%, preferably of over 80% and in particular of over 90%, by the interlocking of the particles of a respective one of the two condensed phases in one another. Such a configuration advantageously allows the article to be securely held in position by means of a natural force.

Moreover, it is proposed that the adhesive force is at least partially formed as a van der Waals force. Alternatively, the adhesive force could be at least partially formed as a diffusion force, in particular as a diffusion force on the basis of a Brownian molecular motion. It is likewise conceivable that the adhesive force is at least partially formed as an adsorption force and/or as a wetting force. The phrase that the "adhesive force is at least partially formed as a van der Waals force" is to be understood in particular as meaning that an absolute amount of the adhesive force is produced in a proportion of over 70%, preferably of over 80% and in particular of over 90%, by a van der Waals force. A "van der Waals force" is to be understood in particular as meaning a force between at least two, preferably nonpolar, in particular uncharged, minute particles, in particular between molecules and/or atoms, preferably noble gas atoms. In particular, the van der Waals force is at least partially formed as an electrostatic van der Waals interaction. In particular, the van der Waals force is intended to connect the minute particles to one another by means of the van der Waals interaction. Preferably, a van der Waals binding energy in a range from 0.5 kJ/mol to 5 kJ/mol can be achieved by means of the van der Waals force. In particular, the van der Waals binding energy decreases at least substantially at an exponential rate to a power of six of a distance between the minute particles. Preferably, the van der Waals force is formed as a Keesom interaction and/or as a Debye interaction and/or as a London dispersion interaction. A "Keesom interaction" is to be understood in particular as meaning an interaction between at least two dipoles. In particular, the van der Waals force formed as a Keesom interaction is formed as a force between at least two dipoles. A "Debye interaction" is to be understood in particular as meaning an interaction between at least one dipole and at least one polarizable molecule. In particular, the van der Waals force formed as a Debye interaction is formed as a force between at least one dipole and at least one induced dipole. A "London dispersion interaction" is to be understood in particular as meaning an interaction between at least two polarizable molecules. In particular, the van der Waals force formed as a London dispersion interaction is formed as a force between at least two polarizable molecules, in particular between at least two induced dipoles. The phrase that the "van der Waals force is at least partially formed as an electrostatic van der Waals interaction" is to be understood in particular as meaning that an absolute amount of the van der Waals force is produced in a proportion of over 70%, preferably of over 80% and in particular of over 90%, by the electrostatic van der Waals interaction. "At least substantially" is to be understood in particular as meaning that a deviation from a predetermined value deviates in particular less than 25%, preferably less than 10% and particularly preferably less than 5%, from the predetermined value. Such a configuration advantageously allows a well researched force to be exploited to hold the article in position, whereby stability of the article in the position can be improved.

It is also proposed that the article holding element has a self-cleaning article holding element surface. In particular, the article holding element surface is intended to clean the article holding element surface of the article holding element when there is contact of the article holding element surface with at least one further element. In particular, the article holding element has at least one micro holding element, preferably a multiplicity of micro holding elements. Preferably, the article holding element surface is intended to clean the article holding element surface by means of at least one of the micro holding elements, preferably by means of the multiplicity of micro holding elements. Preferably, the micro holding element is at least partially formed as dirt-repellent. In particular, the micro holding element is intended to at least substantially repel at least one contaminant coming into contact with the micro holding element on the basis of an absolute amount of at least one micro holding element longitudinal extent. In particular, a force of attraction between the contaminant, in particular between at least one particle of the contaminant, and the micro holding element is less than a force of attraction between the contaminant and the further element. The phrase that the "micro holding element is at least partially formed as dirt-repellent" is to be understood in particular as meaning that the micro holding element is intended to repel a proportion by mass of over 70%, preferably of over 80% and in particular of over 90%, of a contaminant coming into contact with the micro holding element. The phrase "at least substantially repel" a contaminant coming into contact with the micro holding element is to be understood in particular as meaning repelling a proportion by mass of over 70%, preferably of over 80% and in particular of over 90%, of the contaminant coming into contact with the micro holding element. A "contaminant" is to be understood in particular as meaning dirt, dust and/or a liquid, in particular beverages and/or oil. In particular, the contaminant is formed by particles with a size in a range of several μm, a force between the individual particles of the contaminant being less than a force between the contaminant and the article holding element surface of the article holding element on which the contaminant is located. Such a configuration advantageously allows a clean, easy-care article holding element to be achieved.

Furthermore, an article holding device, in particular a navigation system holding device, with at least one article holding element, which is intended to hold at least one article, in particular a navigation system, in at least one position, the article holding element comprising at least one specifically activatable liquid, is proposed. In particular, the article holding element is at least partially formed as the specifically activatable liquid. Alternatively, it is conceivable that the article holding element comprises a specifically activatable, in particular soft, advantageously gel-like, polymer. The phrase that the "article holding element is at least partially formed as the specifically activatable liquid" is to be understood in particular as meaning that the article holding element is formed in a proportion by mass of over 70%, preferably of over 80% and in particular of over 90%, as the specifically activatable liquid. "Specifically" is to be understood in particular as meaning deliberately and/or as planned. "Activatable" is to be understood in particular as meaning controllable and/or influenceable. Such a configuration advantageously allows the article to be held in position by means of a specifically influenceable liquid, whereby a flexible capability of holding the article in position can be achieved.

Moreover, it is proposed that the liquid is at least partially formed as a magnetorheological liquid. Alternatively, the liquid could be at least partially formed as an electrorheological liquid. Alternatively, it is conceivable that the specifically activatable, in particular soft, advantageously gel-like, polymer is formed as a magnetorheological polymer. The phrase that the "liquid is at least partially formed as a magnetorheological liquid" is to be understood in particular as meaning that the liquid is formed in a proportion by mass and/or a proportion by volume of over 70%, preferably of over 80% and in particular of over 90%, as the magnetorheological liquid. A "magnetorheological liquid" is to be understood in particular as meaning a magnetorheological material in which a carrier is formed as a liquid. A "magnetorheological material" is to be understood in particular as meaning a suspension of magnetic particles, preferably with a size in a range of several μm, in a carrier. In particular, the magnetorheological material is intended to change at least one, preferably rheological, material property, preferably rapidly, in particular reversibly, when a magnetic field of less than 0.1 T, preferably of less than 0.01 T and in particular of less than 0.001 T, is applied. Preferably, a change of the material property can be influenced by a variation of the field. In particular, the change of the material property is proportionate to a strength of the applied field. Preferably, when the field is applied, material property changes of several hundred percent can be achieved. In particular, the magnetorheological material is intended to revert, preferably rapidly, to its original state after the applied field is switched off, in particular to its state before application of the field. Preferably, the material property is formed as a shape and/or as a viscosity and/or as a stiffness of the magnetorheological material. In particular, the particles are dispersed in the carrier in a proportion by volume of between 5% and 50% of a total volume of the magnetorheological material. Preferably, the particles are formed as ferromagnetic and/or paramagnetic particles. For example, the particles are formed as iron, iron oxide, iron nitride, iron carbide, carbonyl iron, nickel, cobalt, chromium oxide and/or a combination of at least one of the aforementioned materials with at least one further material. For example, the carrier is formed as polyalphaolefins, natural rubber, silicone, polybutadiene, polyethylene, polyisoprene and/or as a combination of at least one of the aforementioned materials with at least one further element. A "suspension" is to be understood in particular as meaning a, preferably heterogeneous, substance mixture of at least one carrier material and particles distributed in the carrier material, preferably with a particle size of less than 100 μm, preferably of less than 50 μm and in particular of less than 10 μm. In particular, the carrier material is formed as a liquid. "Rapidly" is to be understood in particular as meaning a time period of a few milliseconds. Such a configuration advantageously allows a magnetically influenceable liquid to be achieved, and consequently easy influencing of a holding of the article in position.

It is also proposed that the article holding device has at least one setting unit, which is intended to set at least one material property change of the article holding element. A "setting unit" is to be understood in particular as meaning a unit which is intended to set at least one characteristic variable, in particular the material property change, specifically, preferably as planned, in particular deliberately. In particular, the setting unit comprises at least one setting system. A "setting system" is to be understood in particular as meaning a unit with a processor unit and with a memory unit and also with an operating program stored in the memory unit. In principle, the setting unit may have a number of setting systems connected to one another, which are preferably intended for communicating with one another via a bus system, such as in particular a CAN bus system. In particular, the setting system comprises at least one open-loop control unit and/or at least one closed-loop control unit. An "open-loop control unit" is to be understood in particular as meaning a unit which is intended to influence the characteristic variable once and subsequently keep it in the influenced state. A "closed-loop control unit" is to be understood in particular as meaning a unit which is intended to influence the characteristic variable once, subsequently check whether the influenced characteristic variable achieves a desired effect and, according to a result of the check, influence the characteristic variable once again. In particular, the closed-loop control unit is intended to control, in particular monitor, the characteristic variable in a continuously sustained control loop. The phrase that the setting unit is intended to set the characteristic variable "specifically" is to be understood in particular as meaning that the setting unit is intended to set, preferably influence, in particular control, the characteristic variable in a specific direction, preferably as planned, in particular deliberately. A "material property change" of an element, in particular of the article holding element, is to be understood in particular as meaning a change of at least one physical and/or chemical and/or geometrical parameter. For example, the parameter is formed as a density, a refractive index, a lattice structure and/or a geometry. Likewise conceivable are further parameters that appear appropriate to a person skilled in the art. In particular, the material property change is formed at least as a change of a viscosity. Alternatively, it is conceivable that, in the case of the specifically activatable, in particular soft, advantageously gel-like, polymer, the material property change is formed as a change of shape and/or as a change of stiffness. Advantageously, the article holding element is intended to create by means of the material property change at least one positive engagement with the article. Such a configuration advantageously allows the article to be held in position by means of a material property change of the article holding element that can be set by the setting unit, and consequently allows flexibility to be further increased.

Furthermore, it is proposed that the article holding device has at least one field generating unit, which is intended to generate at least one field. In particular, the field generating unit is intended to generate the field for influencing the article holding element. Preferably, the field is formed as a magnetic field. A "field generating unit" is to be understood in particular as meaning a unit which is intended to generate an internal and/or an external field. In particular, the field generating unit is intended to influence at least one element, in particular the article holding element, specifically, preferably as planned, in particular deliberately, by means of the field. An "internal field" is to be understood in particular as meaning a field within the element. An "external field" is to be understood in particular as meaning a field outside the element. In particular, the field generating unit is intended to generate the external field outside the element. Such a configuration advantageously allows the article holding element to be influenced in a simple, dependable way.

Moreover, a dashboard with at least one article holding device according to the invention is proposed. Such a configuration advantageously allows a dashboard to be equipped with the article holding device according to the invention, whereby a flexible dashboard on which an article can be held in position in a secure, flexible way can be achieved. Furthermore, the dashboard can advantageously be formed as a direct article holder.

Also proposed is a method for operating an article holding device according to the invention, in which the micro holding elements bring about at least one holding force. Such a configuration advantageously allows the article holding device according to the invention to be actuated dependably, flexibly, correctly and reproducibly.

The article holding device according to the invention is not intended here to be restricted to the application and embodiment described above. In particular, the article holding device according to the invention may have a different number of individual elements, components and units than the number mentioned here in order to perform a type of function described here.

BRIEF DESCRIPTION OF THE DRAWINGS

Further advantages emerge from the following description of the drawing. In the drawing, two exemplary embodiments of the invention are represented. The drawing, the description and the claims contain numerous features in combination. A person skilled in the art will expediently also consider the features independently and put them together in other meaningful combinations.

In the drawing.

DETAILED DESCRIPTION

Figure 1:
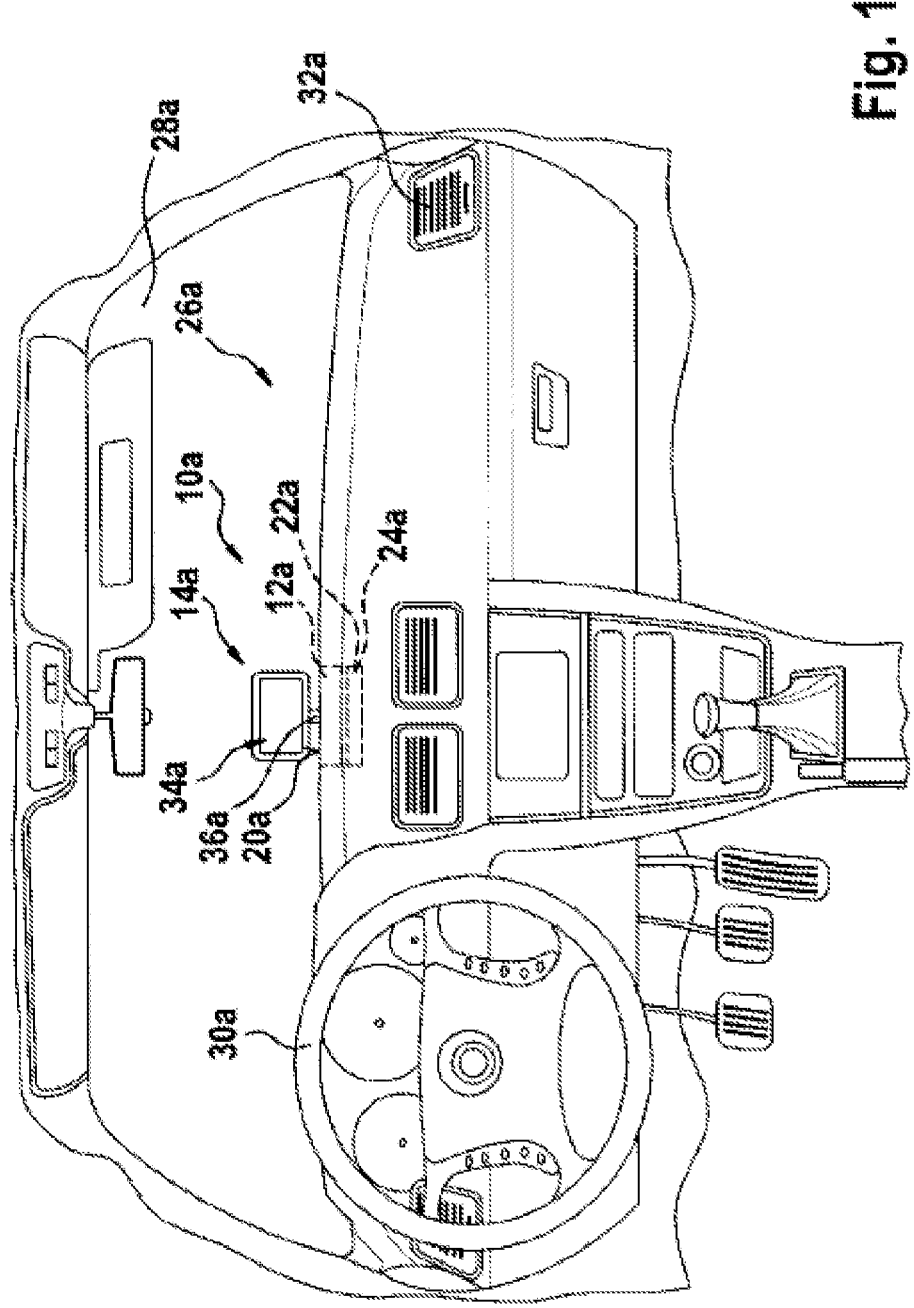
FIG. 1 shows a detail of a dashboard according to the invention with an article holding device according to the invention in a simplified representation.

FIG. 1 shows a detail of a dashboard 26a according to the invention with an article holding device 10a according to the invention in a simplified representation. Moreover, FIG. 1 shows a view of a cockpit arranged in a passenger compartment of a vehicle (not represented). The dashboard 26a is formed as a vehicle dashboard and is arranged in the passenger compartment of the vehicle. The vehicle is formed as a motor vehicle. The dashboard 26a is formed as a motor vehicle dashboard. In FIG. 1, a windowpane 28a, which is formed as a windshield, is arranged adjoining the dashboard 26a. Arranged on the dashboard 26a is a steering wheel 30a for steering the vehicle. The dashboard 26a also comprises a number of air vents 32a, by means of which ventilation of the passenger compartment is realized. For the sake of overall clarity, only one of the air vents 32a is provided with a reference sign in FIG. 1. Further components that are represented in FIG. 1 are not described any more specifically, since only the features that are essential to the invention are described below.

The article holding device 10a comprises an article holding element 12a, which is intended to hold an article 14a in a position. The article holding element 12a is partially represented by dashed lines in FIG. 1, since the article holding element 12a is concealed by the dashboard 26a. The article holding element 12a is arranged within the dashboard 26a with the exception of an article holding element surface 20a. The article holding device 10a is formed as a navigation system holding device and the article 14a is formed as a navigation system. The article 14a comprises a main article region 34a and an article foot 36a. The main article region 34a and the article foot 36a are formed in one piece. In the position in which the article 14a is held by the article holding element 12a, the article foot 36a is arranged in direct contact with the article holding element surface 20a. FIG. 1 shows the article 14a in this position, which for the sake of simplicity is referred to hereinafter as the position. A state in which the article 14a is in the position is referred to hereinafter as a fastened state. A state in which the article 14a is absent is referred to hereinafter as an unfastened state.

Figure 2:
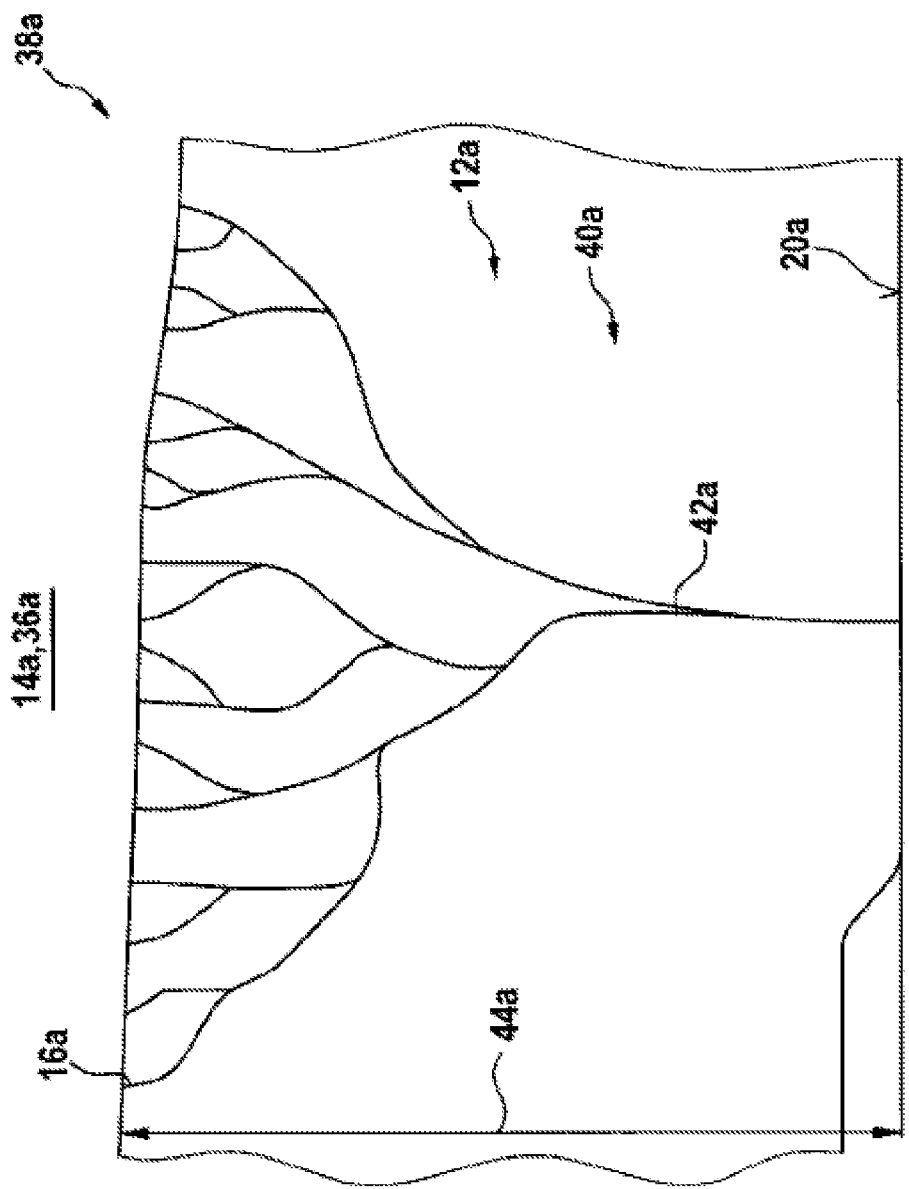
FIG. 2 shows a micro holding structure with a number of micro holding elements according to the invention in a greatly enlarged representation and FIG. 3 shows a detail of an alternative exemplary embodiment of a dashboard according to the invention with an article holding device according to the invention in a simplified representation.

The article holding element 12a has a multiplicity of micro holding elements 16a, which are intended to bring about a holding force. The micro holding elements 16a respectively have a micro holding element longitudinal extent of less than 1 μm, for which reason the micro holding elements 16a cannot be seen in FIG. 1. FIG. 2 shows a micro holding structure 40a with a number of micro holding elements 16a according to the invention in a greatly enlarged representation. The article holding element 12a comprises the micro holding structure 40a, which is arranged on the article holding element surface 20a. The micro holding structure 40a is arranged in an article holding element surface region 38a of approximately 100 μm around the article holding element surface 20a. The micro holding structure 40a comprises a multiplicity of micro holding lamellae 42a, only one of the micro holding lamellae 42a being represented in FIG. 2. Hereinafter, only one of the micro holding lamellae 42a is described, since all the micro holding lamellae 42a are constructed similarly. The various micro holding lamellae 42a differ only in the number of micro holding elements 16a arranged on the respective micro holding lamella 42a and in the number of branches of the respective micro holding lamella 42a.

The micro holding lamella 42a is intended to fasten a number of micro holding elements 16a on the article holding element surface 20a. The micro holding element 16a is arranged in the region of the micro holding lamella 42a that is facing away from the article holding element surface 20a. The micro holding element 16a is respectively arranged here at a tip of the micro holding lamella 42a that is facing away from the article holding element surface 20a. In the fastened state of the article 14a, the micro holding element 16a is in direct contact with a surface of the article 14a. Here, in the fastened state of the article 14a, the micro holding element 16a is in direct contact with a surface of the article foot 36a. The micro holding lamella 42a comprises a number of branches. Moreover, the micro holding lamella 42a comprises a number of tips corresponding to a number of micro holding elements 16a. A more detailed description of FIG. 2 will not be provided, since FIG. 2 merely shows a micro holding structure 40a that is given by way of example.

The micro holding lamella 42a has a micro holding lamella longitudinal extent 44a of approximately 100 μm. The micro holding element 16a has the micro holding element longitudinal extent in a range from 0.2 μm to 0.5 μm. In FIG. 2, the micro holding element longitudinal extent is not represented on account of its absolute amount. The micro holding element 16a is intended to bring about an adhesive force. The holding force is formed as a sum of a multiplicity of adhesive forces. The adhesive force is formed as a van der Waals force. The micro holding element 16a is intended to bring about a van der Waals force. The holding force is formed as a sum of a multiplicity of van der Waals forces.

The article holding element 12a has a self-cleaning article holding element surface 20a. The article holding element surface 20a comprises the multiplicity of micro holding elements 16a. The micro holding element 16a is intended to repel a contaminant coming into contact with the micro holding element 16a on the basis of an absolute amount of the micro holding element longitudinal extent. The micro holding element 16a is formed as dirt-repellent.

For a further description of the article holding device 10a, reference is made to FIG. 1. The article holding device 10a comprises a field generating unit 24a, which is intended to generate a field. The field is formed as a magnetic field. The field generating unit 24a is formed as an electromagnet and is arranged within the dashboard 26a. The field generating unit 24a is arranged here on a side of the article holding element 12a that is facing away from the article holding element surface 20a. Moreover, the article holding device 10a comprises a setting unit 22a, which is intended to set a material property change of the article holding element 12a. The material property change of the article holding element 12a is formed as an orientation of the micro holding element 16a. The setting unit 22a and the field generating unit 24a are formed in one piece. Alternatively, the setting unit 22a could be arranged at any desired location that appears appropriate to a person skilled in the art, as long as an electrical connection with the field generating unit 24a is ensured. In the present exemplary embodiment, the setting unit 22a comprises a storage battery (not represented), which is intended to provide electrical energy. Alternatively, the setting unit 22a could have a supply access to a supply with electrical energy; for example, the setting unit 22a could be connected by means of the supply access to an electronics system of the vehicle. The setting unit 22a is intended to set the material property change of the article holding element 12a by means of the field generating unit 24a.

The micro holding element 16a is intended to bring about the adhesive force in dependence on the field. In the present exemplary embodiment, the micro holding element 16a is formed as a magnetic particle. The micro holding element 16a is formed here as a ferromagnetic particle. In the present exemplary embodiment, the micro holding element 16a is formed as a nickel particle. Alternatively, the micro holding element 16a could be formed as a particle of cobalt and/or iron. Further ferromagnetic particles that appear appropriate to a person skilled in the art are likewise conceivable. The micro holding element 16a is intended in the presence of the field to change an orientation according to an alignment of the field. In an oriented state, the micro holding element 16a is intended to bring about the adhesive force.

Likewise provided is a method for operating the article holding device 10a according to the invention, in which the micro holding elements 16a bring about the holding force. In a first method step, a signal for a setting of the holding force is transmitted to the setting unit 22a, for example by a vehicle driver by means of an actuating element (not represented) arranged on the cockpit. The setting unit 22a sets the material property change of the article holding element 12a by means of the field generating unit 24a. The micro holding element 16a is oriented on the basis of the field and thereby brings about the adhesive force. The bringing about of the adhesive force has the effect that the micro holding element 16a likewise brings about the holding force, since the holding force is formed as the sum of the respective adhesive force generated by the respective micro holding element 16a. As a result, the dashboard 26a is formed as a direct article holder.

Figure 3:
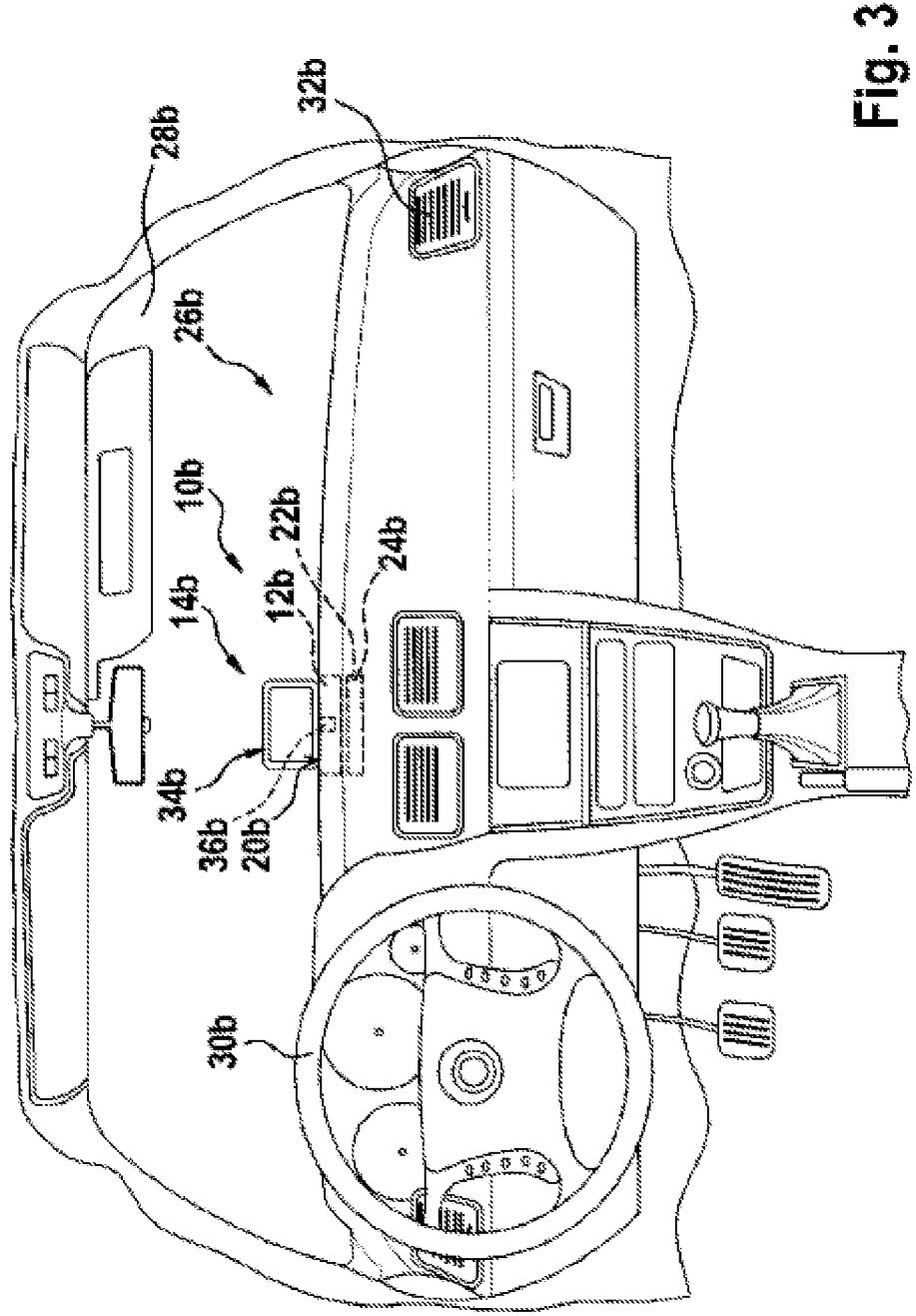

A further exemplary embodiment of the invention is shown in FIG. 3. The following descriptions and the drawing are substantially restricted to the differences between the exemplary embodiments, while reference with respect to components with the same designations, in particular with respect to components with the same reference signs, may in principle be made to the drawing and/or the description of the other exemplary embodiment, in particular of FIG. 1 and FIG. 2. To distinguish between the exemplary embodiments, the letter a is placed after the reference signs of the exemplary embodiment in FIG. 1 and FIG. 2. In the exemplary embodiment of FIG. 3, the letter a is replaced by the letter b.

FIG. 3 shows a detail of an alternative exemplary embodiment of a dashboard 26b according to the invention with an article holding device 10b according to the invention in a simplified representation. The dashboard 26b is identical to the dashboard 26a of the exemplary embodiment of FIG. 1 and FIG. 2 with the exception of the article holding device 10b, for which reason the dashboard 26b is not described any further. By analogy with the exemplary embodiment of FIG. 1 and FIG. 2, the article holding device 10b comprises an article holding element 12b, which is intended to hold an article 14b in a position. The article holding device 10b is formed as a navigation system holding device and the article 14b is formed as a navigation system. The article 14b comprises a main article region 34b and an article foot 36b.

In a difference from the exemplary embodiment of FIG. 1 and FIG. 2, the article holding element 12b comprises a specifically activatable liquid. The liquid is formed here as a magnetorheological liquid. The article holding element 12b comprises a magnetorheological liquid. In this case, the article holding element 12b comprises a specifically activatable magnetorheological liquid. The dashboard 26b forms a lateral delimitation of the article holding element 12b and thereby prevents distribution of the liquid of the article holding element 12b in a passenger compartment. In an unfastened state of the article 14b, to be precise in the absence of the article 14b, the article holding element 12b is covered by a film (not represented). An article holding element surface 20b of the article holding element 12b is formed here as the film. The article holding element surface 20b is fixedly connected on a respective side to the dashboard 26b. The article holding element surface 20b is formed from an elastic material and is intended to change a geometry. The article holding element surface 20b is intended to adapt its geometry to a geometry of the article 14b. Moreover, the article holding element surface 20b is intended to prevent the distribution of the liquid of the article holding element 12b in the passenger compartment.

In a fastened state, the article 14b is partially arranged within a region that is filled by the article holding element 12b in the unfastened state. In the exemplary embodiment shown, the article foot 36b is arranged entirely region of the article holding element 12b that is filled by the article holding element 12b in the unfastened state. The main article region 34b is arranged at a limit of the region of the article holding element 12b that is filled by the article holding element 12b in the unfastened state. The article 14b is intended to displace the article holding element surface 20b and the liquid by means of a force of the weight of the article 14b. The liquid and the article holding element surface 20b are intended to adapt their respective geometry to the geometry of the article 14b. This state, in which the article 14b is partially arranged within the region that is filled by the article holding element 12b in the unfastened state and the liquid and the article holding element surface 20b have adapted their respective geometry to the geometry of the article 14b, is referred to hereafter as the pre-fastened state.

By analogy with the exemplary embodiment of FIG. 1 and FIG. 2, the article holding device 10b comprises a field generating unit 24b, which is intended to generate a field, the field being formed as a magnetic field. Moreover, the article holding device 10b comprises a setting unit 22b, which is intended to set a material property change of the article holding element 12b. The material property change of the article holding element 12a is formed as a change of viscosity of the liquid. The setting unit 22b is intended to set the material property change of the article holding element 12b by means of the field generating unit 24b. The formation and arrangement of the field generating unit 24*b* and of the setting unit 22*b* are identical to the formation and arrangement of corresponding units of the exemplary embodiment of FIG. 1 and FIG. 2, for which reason they are not described any further.

In the pre-fastened state of the article 14*b*, a signal for a setting of the holding force is transmitted to the setting unit 22*b*, for example by a vehicle driver by means of an actuating element (not represented) arranged on a cockpit. The setting unit 22*b* sets the material property change of the article holding element 12*b* by means of the field generating unit 24*b*. The liquid changes its viscosity on the basis of the field and becomes virtually solid. In this case, the liquid brings about a holding force on the article 14*b*, whereby the article 14*b* is held in position. As a result, the article 14*b* is fastened by means of the holding force on the dashboard 26*b* in a kind of vise. Moreover, the dashboard 26*b* is formed as a direct article holder.

Alternatively, it is conceivable that the article holding element surface 20*b* of the article holding element 12*b* that is formed as the film is formed as a sensor. The article holding element surface 20*b* is intended here to transmit a signal to the setting unit when there is contact with the article 14*b*. The article 14*b* is intended to displace the article holding element surface 20*b* and the liquid by means of a force of the weight of the article 14*b*. The liquid and the article holding element surface 20*b* are intended to adapt their respective geometry to the geometry of the article 14*b*. The article holding element surface 20*b* is intended to detect by means of the sensor a stop to the movement of the article 14*b*, and consequently an end position of the article 14*b*. Moreover, the article holding element surface 20*b* is intended to send a signal to the setting unit 22*b* for the setting of the holding force when the end position of the article 14*b* is reached. Consequently, the setting of the holding force is performed in a partly automated manner. The article holding element 12*b* is intended to hold the article 14*b* in a position in a partly automated manner in dependence on a characteristic variable. Moreover, the article holding element 12*b* is intended to create a positive engagement with the article 14*b*. If a force of over 20 N is applied to the article holding element surface 20*b* of the article holding element 12*b* by means of an article 14*b* located in the held position, the article 14*b* can be released from the position. The article holding element surface 20*b* is intended to send a signal to the setting unit 22*b* when a force of over 20 N acts on the article holding element surface 20*b*. The setting unit 22*b* is intended to generate or remove the holding force in dependence on the signal. Consequently, the article holding element 12*b* is intended to hold the article 14*b* in a position or release it from the position in a partly automated manner in dependence on a characteristic variable.

What is claimed is:

1. An article holding device for holding a navigation system or similar device, the article holding device comprising:
    at least one article holding element, which is intended to hold at least one article in at least one position, the article holding element having a multiplicity of micro holding elements configured to generate a first holding force; and
    at least one field generating unit, configured to generate at least one field,
    wherein the multiplicity of micro holding elements are configured to generate a second holding force in the presence of the at least one field, and
    wherein the second holding force is greater than the first holding force.

2. The article holding device according to claim 1, wherein at least one of the micro holding elements is configured to generate at least one adhesive force.

3. The article holding device according to claim 2, wherein the adhesive force is at least partially formed as a van der Waals force.

4. The article holding device at least according to claim 1, wherein the article holding element has a self-cleaning article holding element surface.

5. The article holding device according to the preamble of claim 1, wherein the article holding element comprises at least one specifically activatable liquid.

6. The article holding device according to claim 5, wherein the liquid is at least partially formed as a magnetorheological liquid.

7. The article holding device according to claim 1, wherein the article holding device further comprises at least one setting unit, which is intended to set at least one material property change of the article holding element.

8. A dashboard for a vehicle, the dashboard comprising:
    an article holding device including at least one article holding element, which is intended to hold at least one article in at least one position, the article holding element having a multiplicity of micro holding elements configured to generate a first holding force; and
    at least one field generating unit, configured to generate at least one field,
    wherein the multiplicity of micro holding elements are configured to generate a second holding force in the presence of the at least one field, and
    wherein the second holding force is greater than the first holding force.

9. The article holding device according to claim 1, wherein the field generating unit is an electromagnet, and wherein the at least one field is a magnetic field.

10. The article holding device according to claim 1, wherein the multiplicity of micro holding elements is formed as a ferromagnetic particle.

11. The article holding device according to claim 7, wherein the at least one material property change generates the second holding force of the multiplicity of micro holding elements.

12. The dashboard according to claim 8, wherein the at least one field generating unit is positioned within the dashboard.

* * * * *